United States Patent
Rousseau et al.

(10) Patent No.: US 11,283,764 B2
(45) Date of Patent: Mar. 22, 2022

(54) SYSTEMS AND METHODS FOR OPERATING A NETWORKING DEVICE

(71) Applicant: OVH, Roubaix (FR)

(72) Inventors: Clement Rousseau, Brest (FR); Tristan Groleat, Brest (FR)

(73) Assignee: OVH, Roubaix (FR)

( * ) Notice: Subject to any disclaimer, the term of this patent is extended or adjusted under 35 U.S.C. 154(b) by 390 days.

(21) Appl. No.: 16/546,806

(22) Filed: Aug. 21, 2019

(65) Prior Publication Data

US 2020/0067881 A1    Feb. 27, 2020

(30) Foreign Application Priority Data

Aug. 27, 2018    (EP) .................................... 18315022

(51) Int. Cl.
| | |
|---|---|
| *H04L 29/06* | (2006.01) |
| *H04L 12/44* | (2006.01) |
| *H04L 45/02* | (2022.01) |
| *H04L 45/00* | (2022.01) |
| *H04L 45/74* | (2022.01) |

(52) U.S. Cl.
CPC .......... *H04L 63/0236* (2013.01); *H04L 12/44* (2013.01); *H04L 45/02* (2013.01); *H04L 45/566* (2013.01); *H04L 45/74* (2013.01); *H04L 63/0245* (2013.01)

(58) Field of Classification Search
CPC ..... H04L 63/0236; H04L 12/44; H04L 45/02; H04L 45/566; H04L 45/74; H04L 63/0245
USPC .......................................................... 726/11
See application file for complete search history.

(56) References Cited

U.S. PATENT DOCUMENTS

| | | |
|---|---|---|
| 7,103,679 B2 | 9/2006 | Bonn |
| 7,331,060 B1 | 2/2008 | Ricciulli |
| 7,571,242 B2 | 8/2009 | Wilson |
| 7,778,176 B2 | 8/2010 | Morford |

(Continued)

FOREIGN PATENT DOCUMENTS

| | | |
|---|---|---|
| EP | 2919432 A1 | 9/2015 |
| WO | 00/28704 A1 | 5/2000 |

OTHER PUBLICATIONS

European Search Report with regard to the counterpad EP Patent Application No. 18315022.6 completed Feb. 1, 2019.

(Continued)

*Primary Examiner* — Evans Desrosiers
(74) *Attorney, Agent, or Firm* — BCF LLP

(57) ABSTRACT

Methods and systems are described for compressing a tree structure associating network packet signatures with network packet metadata, the tree structure comprising a plurality of non-leaf nodes of single bit test nodes and a plurality of leaf nodes comprising network packet metadata, the method comprising determining whether the sub-portion of the tree structure is to be compressed. If determination is made that the sub-portion of the tree structure is to be compressed, generating a compressed node data structure, the compressed node data structure comprising a path of the sub-portion of the tree structure, the path comprising a sequence of bits formed by a concatenation of the single bits associated with each one of the consecutive non-leaf nodes of the sub-portion of the tree structure, the number of bits of the sequence being equal or greater than the compression threshold.

20 Claims, 11 Drawing Sheets

(56) References Cited

U.S. PATENT DOCUMENTS

| | | |
|---|---|---|
| 7,933,985 B2 | 4/2011 | Kurapati et al. |
| 8,005,869 B2 | 8/2011 | Corl et al. |
| 8,046,496 B1 | 10/2011 | Nucci et al. |
| 8,407,342 B2 | 3/2013 | Kurapati et al. |
| 8,472,446 B2 | 6/2013 | Sundstrom et al. |
| 9,245,626 B2 | 1/2016 | Fingerhut et al. |
| 10,511,445 B1* | 12/2019 | Rubin .................. H04L 63/126 |
| 2003/0218978 A1 | 11/2003 | Brown |
| 2005/0240604 A1* | 10/2005 | Corl ....................... H03M 7/30 |
| 2008/0219181 A1 | 9/2008 | Kodialam et al. |
| 2009/0043796 A1* | 2/2009 | Sauermann ............ H04L 41/12 |
| 2011/0138463 A1 | 6/2011 | Kim et al. |
| 2013/0155918 A1 | 6/2013 | Singh et al. |
| 2014/0079061 A1 | 3/2014 | Angst et al. |
| 2015/0058989 A1 | 2/2015 | Lahti et al. |
| 2015/0117450 A1* | 4/2015 | Thibaut .................. H04L 45/38 |
| | | 370/392 |

OTHER PUBLICATIONS

Bergamini et al., "Network of Shortcuts: An Adaptive Data Structure for Tree-Based Search Methods", Ecole Polytechnique Federale de Lausanne (EPFL), 1015 Lausanne, Switzerland, Intel Research, 15 JJ Thomson Avenue, Cambridge, CB3 0FD, United Kingdom, 12 pages.

European Search Report with regard to the counterpart EP Patent Application No. 18315024.2 completed Feb. 1, 2019.

* cited by examiner

SYSTEMS AND METHODS FOR OPERATING A NETWORKING DEVICE

CROSS-REFERENCE

The present application claims priority from European Patent Application No. 1 831 5022.6 filed on Aug. 27, 2018, the entirety of which is incorporated herein by reference.

FIELD

Embodiments described herein relate generally to systems and methods for operating networking devices, and more particularly, to systems and methods for generating and/or operating a data structure associating network data signatures with network packet metadata.

BACKGROUND

Infrastructures connected to the Internet, such as datacenters, may be subjected to attacks aiming at infiltrating or impairing their operations. For example, botnet including a large number of bots can be used to cause a distributed denial of service (DDoS) attack on a datacenter. A DDoS attack may cause the datacenter to be flooded with superfluous requests. When under such an attack, the datacenter processing and communicating capabilities may become so overloaded that it is temporarily unable to provide service to legitimate users and clients. In at least one event, an attack may impose a load of one (1) terabit per second on the datacenter.

Mitigation measures are therefore required so as to reduce negative impacts of potential attacks. Such mitigation measures may consist of filtering illegitimate network packets while letting legitimate network packets access a network of the datacenter. Given a volume of network packets being routed from the Internet to a datacenter, even in instances where the datacenter is of relatively small size, filtering illegitimate network packets from legitimate network packets may require important processing resources and may impact a quality of service to be rendered to legitimate users and clients of the datacenter (e.g., a latency in providing a given service hosted at the datacenter).

Approaches aiming at reducing negative impacts of mitigation measures have been investigated but improvements may still be desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

The following summary is for illustrative purposes only, and is not intended to limit or constrain the detailed description. The following summary merely presents various described aspects in a simplified form as a prelude to the more detailed description provided below.

In certain instances, filtering and/or classifying network packets may require accessing data structure associating network packet signatures with network packet metadata.

In some instances, a network packet signature may be a network address associated with a sending host or a destination host. As an example, but without being limitative, a network packet signature may be an Internet Protocol (IP) address associated with a network packet such as an Internet Protocol version 4 (IPv4) address or an Internet Protocol version 6 (IPv6) address. In another example, a network packet signature may be a section of an IP address (e.g., a network session or a host section of an IP address). In yet other examples, the network packet signature may be generated based on the IP address. In some embodiments, the network packet signature may comprise one or more elements from the list consisting of a source IP address, a destination IP address, an IP protocol (e.g., TCP or UDP), a source TCP or UDP port, a destination TCP or UDP port. In some other embodiments, the network packet signature may comprise a source IP address and/or a destination IP address associated with some metadata (e.g., a profile identifier and or a counter identifier). Variations as to what a network packet signature may encompass will become apparent to the person skilled in the art of the present technology and should not be construed as being limitative.

In some instances, network packet metadata may be information associated or to be associated with one or more network packet signature. As an example, network packet metadata may establish a data packet classification and/or a filtering rule. Such data packet classification may allow determining whether a network packet associated with a network packet signature is legit or not. The classification and/or the filtering rule may establish how a data packet should be treated and/or what service should be performed. For example, a filter rule may be used in testing network packets entering a network of a datacenter from an outside computing device to ensure that attempts to break into a network of the datacenter may be intercepted. Alternative filtering rules may also be used to transmit traffic based on a priority. Network packets from a first host may be transmitted because the network packets have higher priority even when network packets from a second host may be dropped. In some embodiments, the network packet metadata may also be referred to as network packet profile tags. In some embodiments, the network packet metadata may also be referred to as network packet labels (or labels). Variations as to what network packet metadata may encompass will become apparent to the person skilled in the art of the present technology and should not be construed as being limitative.

In certain instances, a data structure associating network packet signatures with network packet metadata may be implemented as a tree structure. The tree structure may comprise non-leaf nodes and leaf nodes. The non-leaf nodes and the leaf nodes may comprise network packet metadata (e.g., labels). A path extending from a root of the tree structure to a leaf of the tree structure (while crossing one or more non-leaf nodes) may define a prefix. Filtering and/or classifying of a network packet may be performed by comparing a network packet signature with one or more prefix from the tree structure. Network packet metadata associated with a longest prefix corresponding to the network packet signature may then be determined as to be associated with the network packet data signature.

Under certain approaches, the tree structure is a binary tree wherein each bit of a network packet signature (e.g., each bit of an IP address) is tested, one by one. Under such naive approaches, a maximum of 32 steps may be required to filter and/or classify an IPv4 address (i.e., an address of 32 bits) and a maximum of 128 steps may be required to filter and/or classify an IPv6 address (i.e., an address of 128 bits). Each step requires a memory access thereby affecting a maximum filtering and/or classifying debit. As a result, there is a need to compress the tree structure so as to reduce a number of required memory accesses.

In one aspect, various implementations of the present technology provide a method of analysing network packets for preventing attacks of a network by filtering illegitimate network packets while letting legitimate network packets access the network, the filtering being based on an association between network addresses and data packet classifications, the association being implemented as a tree structure, the data packet classifications allowing determining whether a network packet is legit, the method being executed by a computing device, the method comprising:

compressing the tree structure associating the network addresses with the data packet classifications, the tree structure comprising a plurality of non-leaf nodes of single bit test nodes and a plurality of leaf nodes comprising data packet classifications, the step of compressing comprising:

determining, based on a number of consecutive non-leaf nodes having a single child and a compression threshold, whether a sub-portion of the tree structure comprising the consecutive non-leaf nodes having a single child is to be compressed;

if determination is made that the sub-portion of the tree structure is to be compressed:

generating a compressed sub-portion of the tree structure, the compressed sub-portion of the tree structure comprising a sequence of bits formed by a concatenation of the single bits associated with each one of the consecutive non-leaf nodes of the sub-portion of the tree structure, the number of bits of the sequence being equal or greater than the compression threshold; and storing the compressed sub-portion of the tree structure in a non-transitory computer-readable memory.

In one aspect, various implementations of the present technology provide a method of compressing a tree structure associating network packet signatures with network packet metadata, the tree structure comprising a plurality of non-leaf nodes of single bit test nodes and a plurality of leaf nodes comprising network packet metadata, the method comprising:

for a sub-portion of the tree structure, establishing a number of consecutive non-leaf nodes having a single child;

determining, based on the number of consecutive non-leaf nodes having a single child and a compression threshold, whether the sub-portion of the tree structure is to be compressed;

if determination is made that the sub-portion of the tree structure is to be compressed:

generating a compressed node data structure, the compressed node data structure comprising a path of the sub-portion of the tree structure, the path comprising a sequence of bits formed by a concatenation of the single bits associated with each one of the consecutive non-leaf nodes of the sub-portion of the tree structure, the number of bits of the sequence being equal or greater than the compression threshold; and storing the compressed node data structure in a non-transitory computer-readable memory.

In some embodiments, the number of bits of the sequence of the compressed node data structure is determined by (1) a presence of one of the consecutive non-leaf nodes having a child leaf node, (2) a presence of one of the consecutive non-leaf nodes having more than one child or (3) a pre-defined maximum size of the sequence.

In some embodiments, if determination is made that the sub-portion of the tree structure is not to be compressed:

generating a non-compressed node data structure, the non-compressed node data structure comprising a path of the sub-portion of the tree structure, the path comprising a sequence of bits formed by a concatenation of one or more single bits associated with at least one non-leaf node of the sub-portion of the tree structure, the at least one non-leaf node having more than one child, the number of bits of the sequence being less than the compression threshold; and storing the non-compressed node data structure in a non-transitory computer-readable memory.

In some embodiments, the compression threshold is 5 bits. In some embodiments, the predefined maximum size of the sequence is 30 bits.

In some embodiments, the non-transitory computer-readable memory comprises a first non-transitory computer-readable memory and a second non-transitory computer-readable memory. In some embodiments, (1) the compressed node data structure is a first compressed node data structure and (2) the non-compressed node data structure is a first non-compressed node data structure, wherein a first node data structure comprises one of the first compressed node data structure and the first non-compressed node data structure and a second node data structure comprises one of a second compressed node data structure and a second non-compressed data structure.

In some embodiments, the first node data structure is stored in the first non-transitory computer-readable memory and points to a memory address of the second non-transitory computer-readable memory wherein the second node data structure is stored.

In some embodiments, the first node data structure can be accessed from the first non-transitory computer-readable memory through a first single memory access and the second node data structure can be accessed from the second non-transitory computer-readable memory through a second single memory access.

In some embodiments, the first non-transitory computer-readable memory is a first bank of a first QDR SRAM memory and the second non-transitory computer-readable memory is a second bank of a second QDR SRAM memory.

In some embodiments, the compressed node data structure is a first compressed node data structure and the non-compressed node data structure is a first non-compressed node data structure and wherein the non-transitory computer-readable memory comprises a first part, a second part and a third part, the first part storing one of the first compressed node data structure and the first non-compressed node data structure pointing to one of a second compressed node data structure and a second non-compressed node data structure stored in the second part and wherein:

upon updating the tree structure, storing one of a third compressed node data structure and a third non-compressed node data structure in the third part and modifying the one of the first compressed node data structure and the first non-compressed node data structure so that it points to the one of the third compressed node data structure and the third non-compressed node data structure.

In some embodiments, the method further comprises at least one (1) transmitting a network packet based on a priority established by the network packet metadata, (2) identifying services to be performed on a network packet based on the network packet metadata, (3) testing a network packet based on the network packet metadata to establish that the network packet is part of a network attack and/or (4) creating metrics on traffic of network packets based on the network packet metadata.

In another aspect, various implementations of the present technology provide a computer-implemented system configured to perform the method described in the paragraphs above.

In another aspect, various implementations of the present technology provide a non-transitory computer-readable medium comprising computer-executable instructions that cause a system to execute the method described in the paragraphs above.

In the context of the present specification, unless expressly provided otherwise, a networking device may refer, but is not limited to, a "router", a "switch", a "gateway", a "system", a "computer-based system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural or functional modifications may be made, without departing from the scope of the present disclosure.

Networks of devices, such as networks housed in a data center, may comprise a variety of different networking hardware, such as routers, switches, multilayer switches, cables, and/or other networking hardware. The networking devices may service various computing devices, such as servers. The networking device may be operating a data structure relied upon in the context of filtering and/or classifying network packets.

Figure 1A:
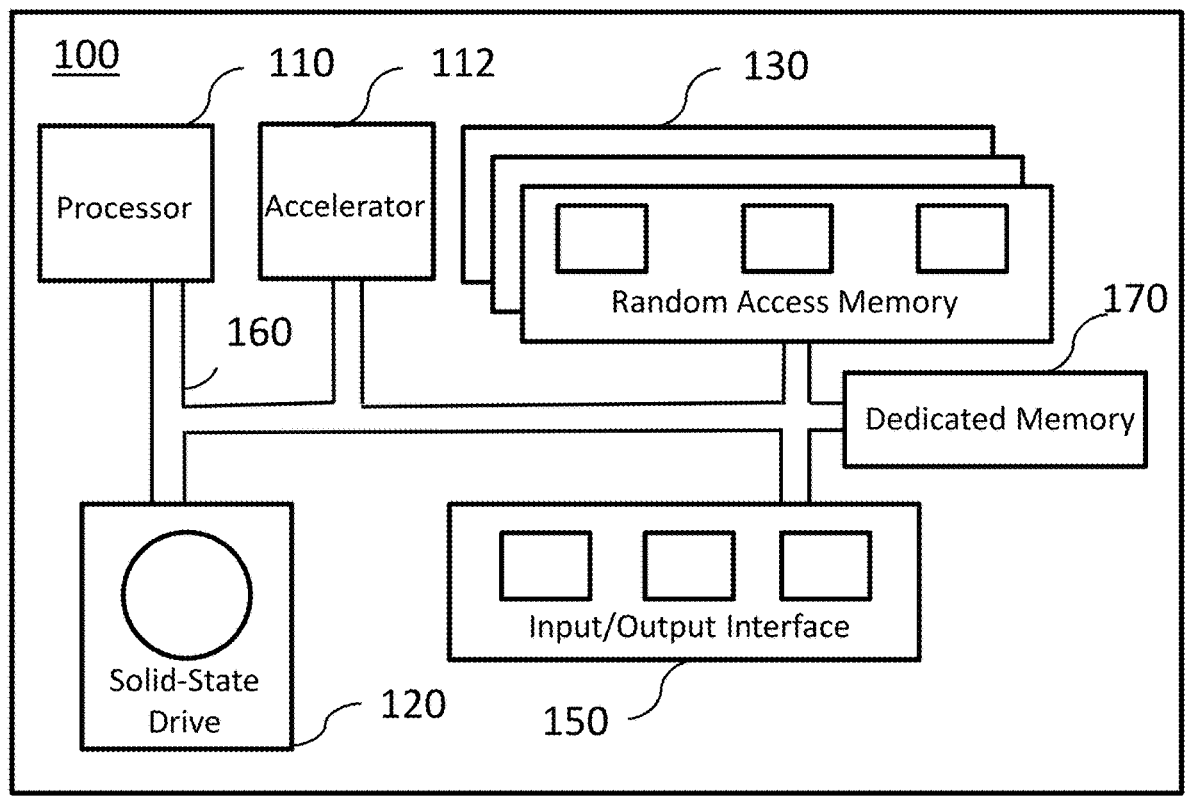
FIGS. 1A and 1B illustrate example networking devices that may be used to implement any of the methods described herein.

FIG. 1A illustrates a diagram of a computing environment 100 in accordance with an embodiment of the present technology. In some embodiments, the computing environment 100 may be implemented by any of a conventional personal computer, a server, a router, a switch, a controller, and/or an electronic device (e.g., a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a Random Access Memory (RAM) memory 130, a dedicated memory 170 and an input/output interface 150. The computing environment 100 may be a computer specifically designed for operating in a data center environment. The computing environment 100 may be a generic computer system.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

In some embodiments of the present technology, the processor 110 may be a general purpose processor, such as a central processing unit (CPU) or a processor dedicated to a specific purpose, such as a digital signal processor (DSP). In some embodiments, the processor 110 may also rely on an accelerator 112 dedicated to certain given tasks, such as executing the methods 1000 set forth in the paragraph below. In some embodiments, the processor 110 or the accelerator 112 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, random access memory (RAM), and non-volatile storage. Other hardware, conventional and/or custom, may also be included.

In some embodiments of the present technology, the RAM 130 may comprise high performance memory such as, but not limited to, Quad Data Rate (QDR) SRAM memory. In some embodiments, the RAM 130 may comprise a plurality of QDR SRAM memories. In addition, in some embodiments, dedicated memory 170 may also be relied upon. Such dedicated memory 170 may be a distinct memory unit or integrated to another component. In some embodiments, the dedicated memory 170 is part of an FPGA processing unit (e.g., a register of the FPGA). In some embodiments, the dedicated memory 170 is implemented as a dedicated portion of the RAM 130. Other variations may also be envisioned without departing from the scope of the present technology.

Figure 1B:
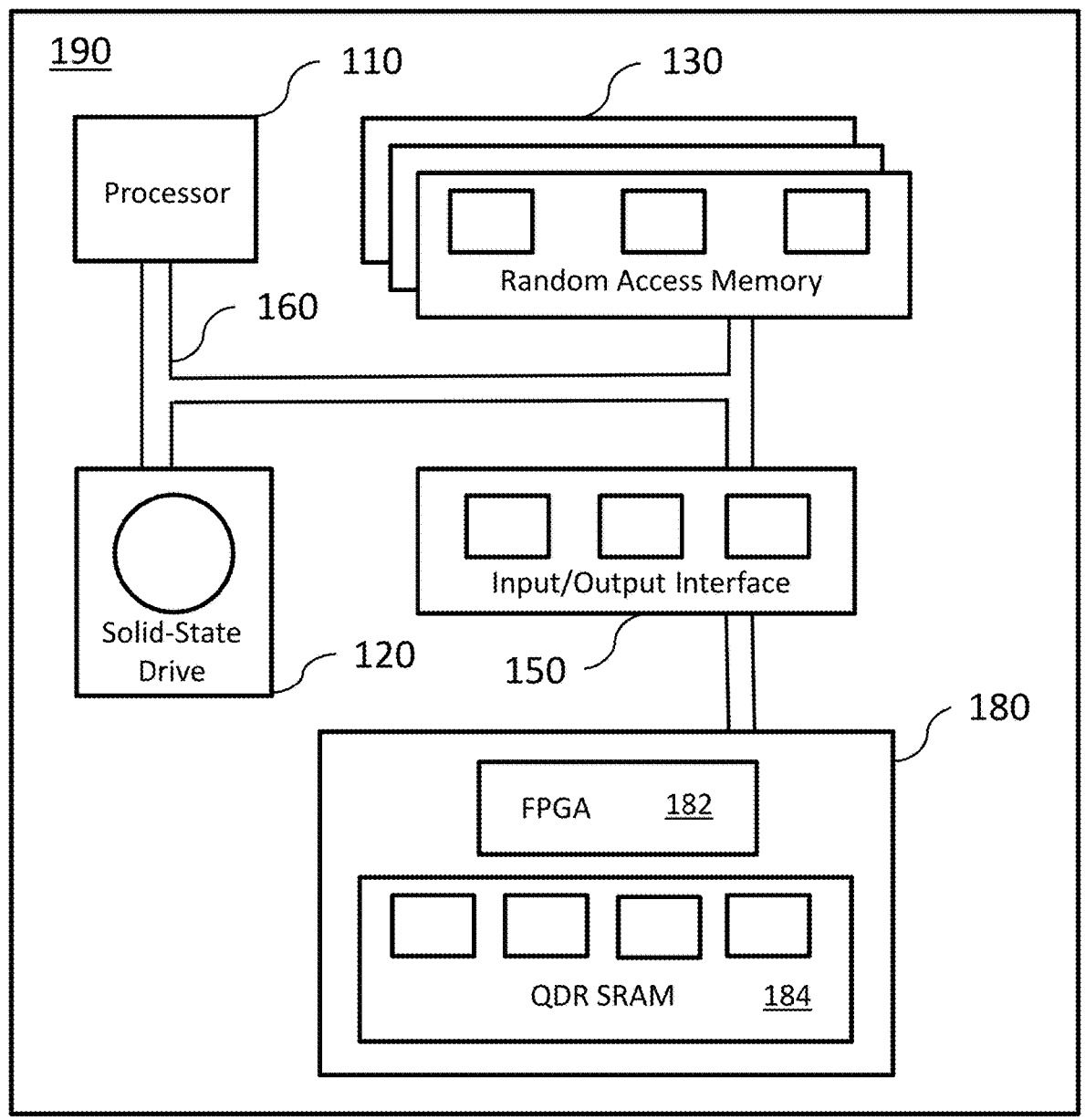

FIG. 1B illustrates a diagram of an alternative computing environment 190 in accordance with an embodiment of the present technology. In some embodiments, the computing environment 190 may be implemented by similar components as the computing environment 100 (similar components being referred to as by same number references). The computing environment 190 comprises a dedicated FPGA card 180 which may be connected to other components of the computing environment either by the Input/Output interface 150 or directly through internal and/or external buses 160. In some embodiments, the FPGA card 180 comprises a FPGA chipset 182 (which may comprise a register, also referred to as a "dedicated memory") and dedicated RAM memory such as the four distinct QDR SRAM memories collectively referred to as QDR SRAM memories 184. In some embodiments, the FPGA card may also comprise one or more input/output interfaces allowing connection to a network.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Figure 2:
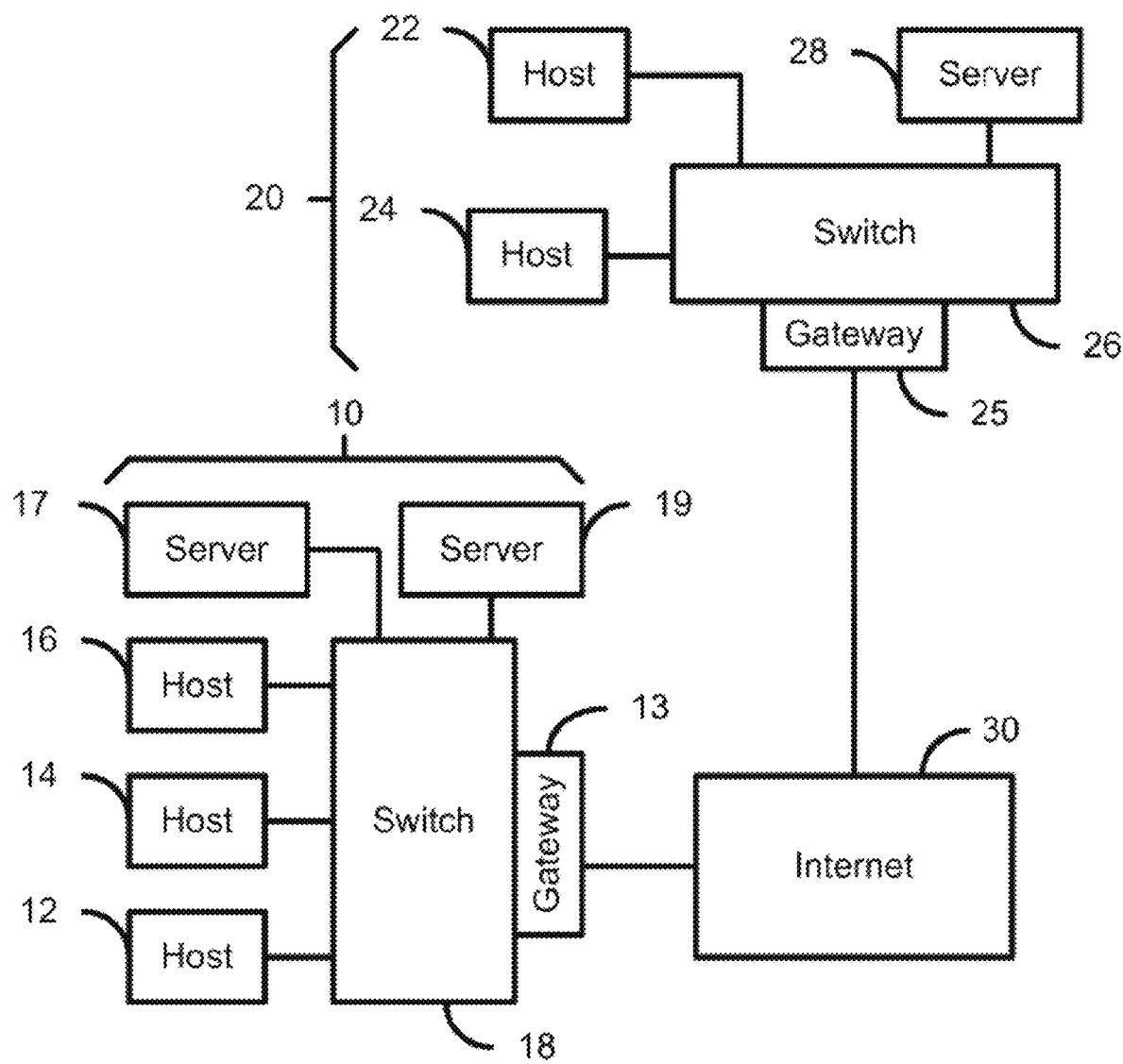
FIG. 2 illustrates a diagram of networking devices and their networking environment in accordance with embodiments of the present technology.

FIG. 2 illustrates a diagram of networking devices and their networking environment in accordance with embodiments of the present technology. Networks 10 and 20 may be connected to the Internet. Networks 10 and/or 20 may define a network associated with, controlled and operated by a datacenter. Each network 10 and 20 may comprise hosts 12, 14 and 16 and 22 and 24, respectively. Each network 10 and 20 may also comprise a switch 18 and 26, respectively, and may include one or more servers such as servers 17, 19 and 28, respectively. Each network 10 and 20 may also comprise one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general. The switches 18 and 26, the gateways 13 and 25 and the routers may generally be referred as networks of devices which may be embodied as computing devices similar to the computing environment 100. The switches 18 and 26, the gateways 13 and 25 and the routers may implement a tree structure associating network packet signatures with network packet metadata in accordance with embodiments of the present technology.

Figure 3:
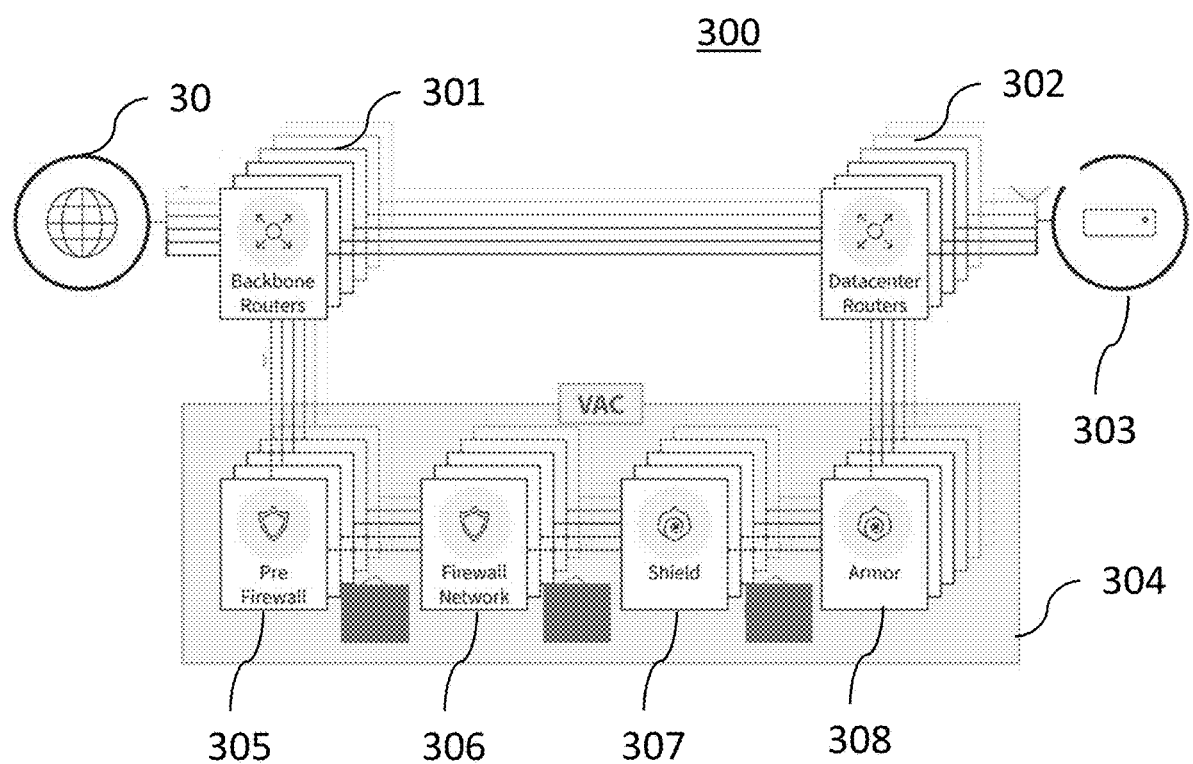
FIG. 3 illustrates a diagram of alternative networking devices and their networking environment in accordance with embodiments of the present technology.
Figure 4:
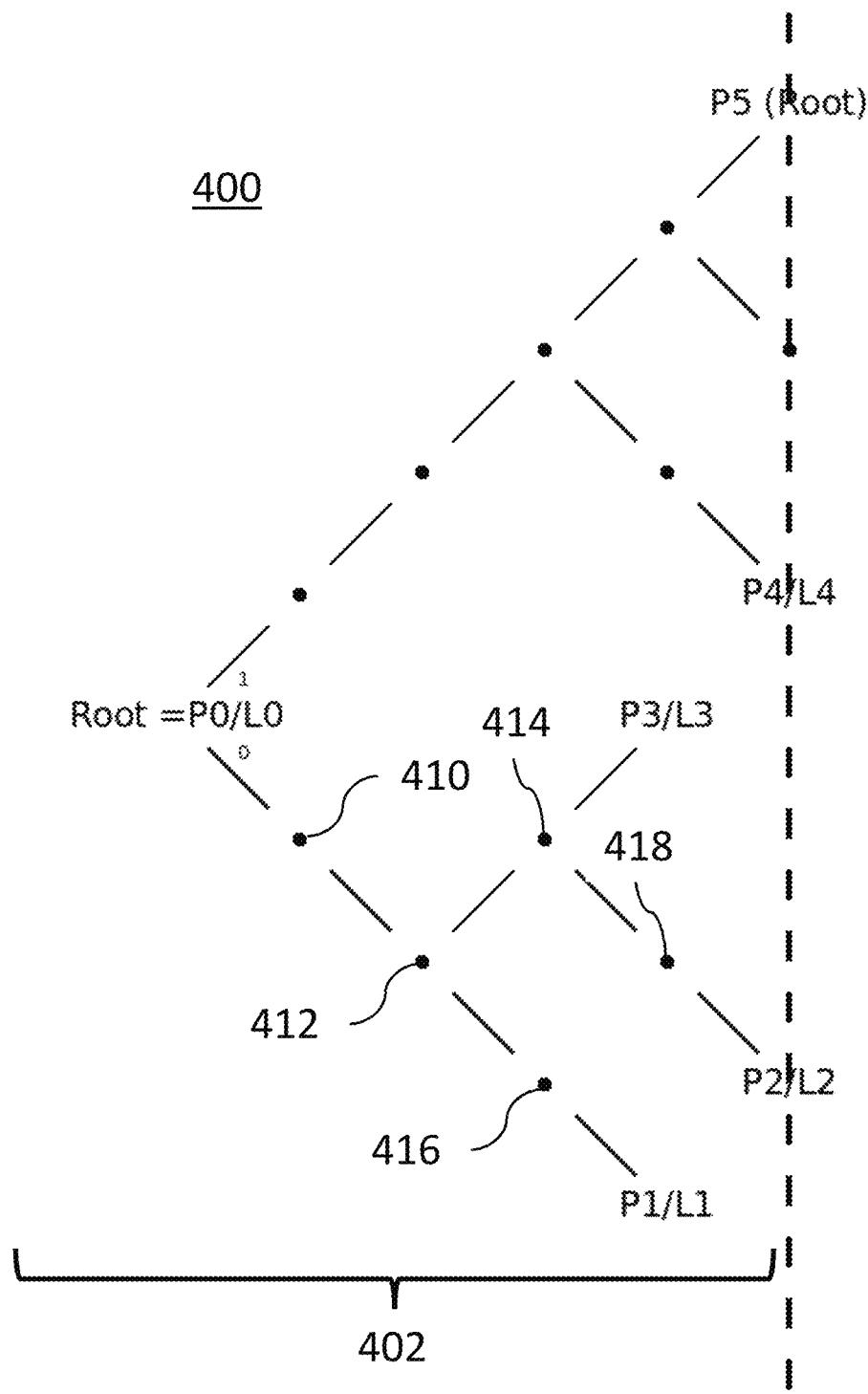
FIGS. 4-7 illustrate a diagram of a tree structure in accordance with embodiments of the present technology.
Figure 5:
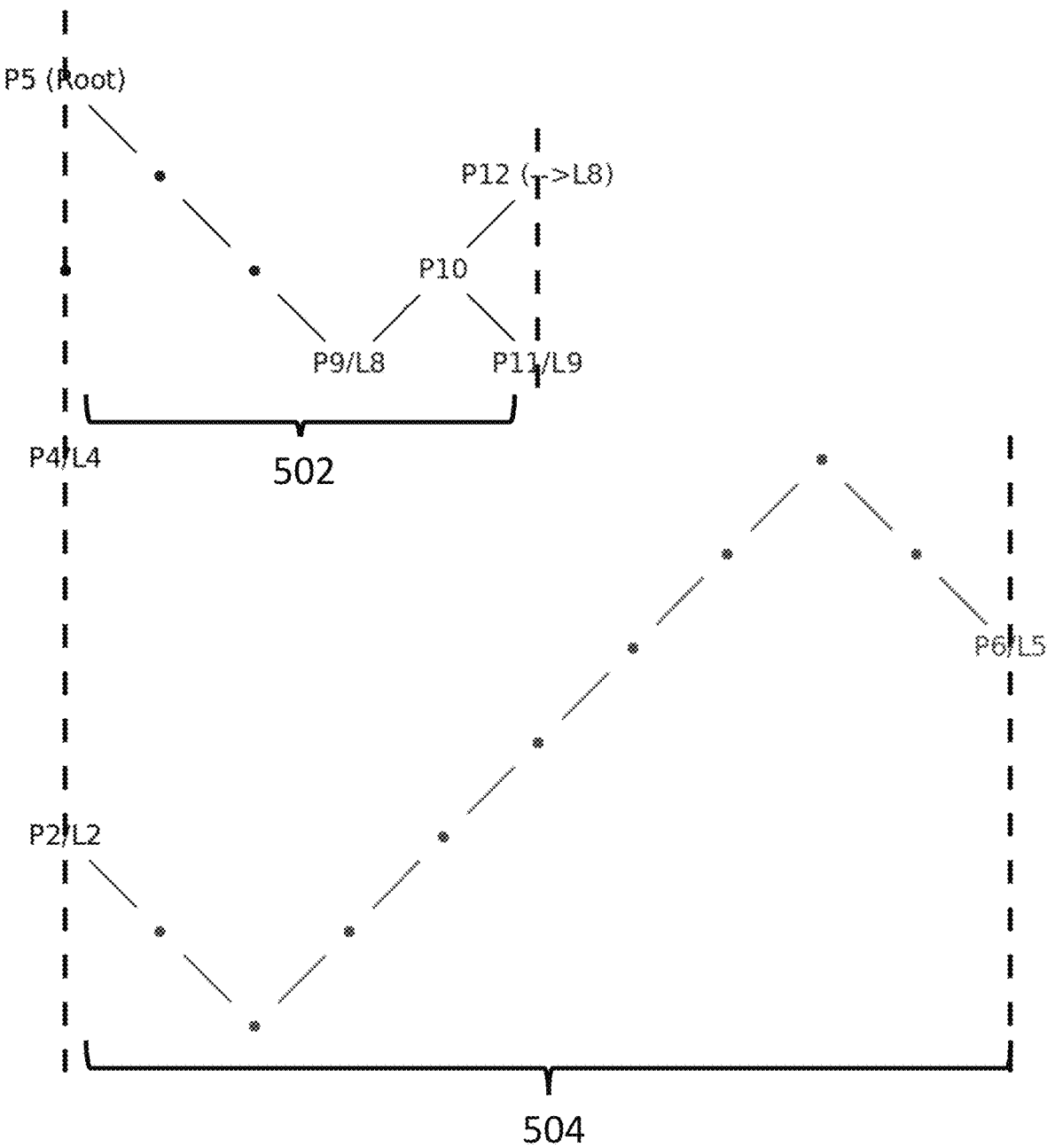
Figure 6:
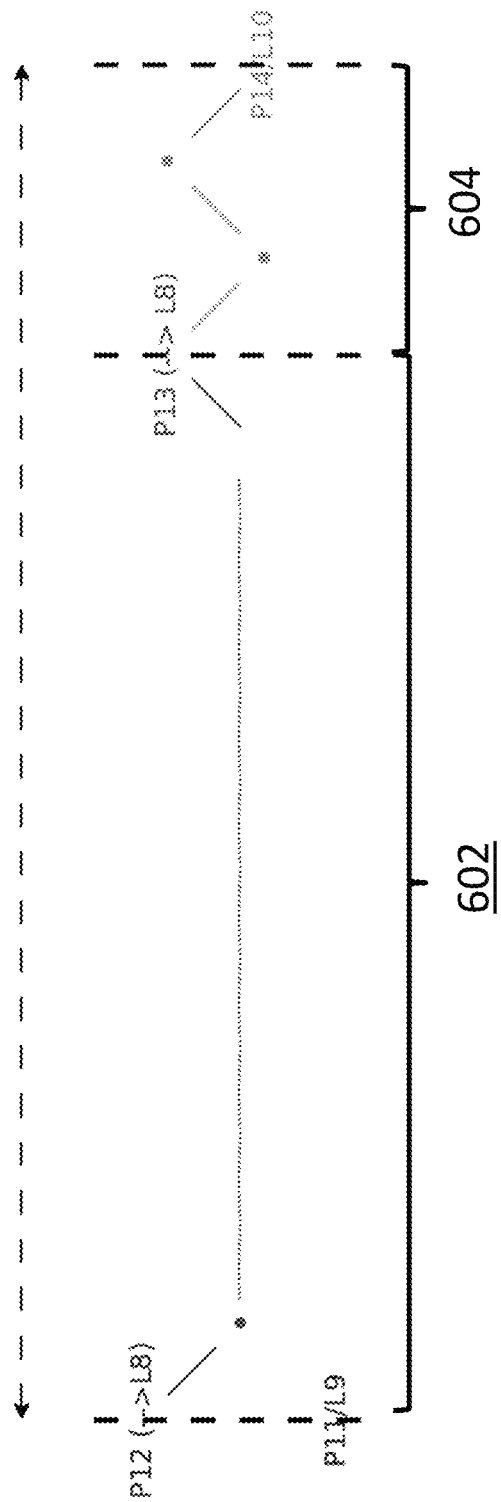
Figure 7:
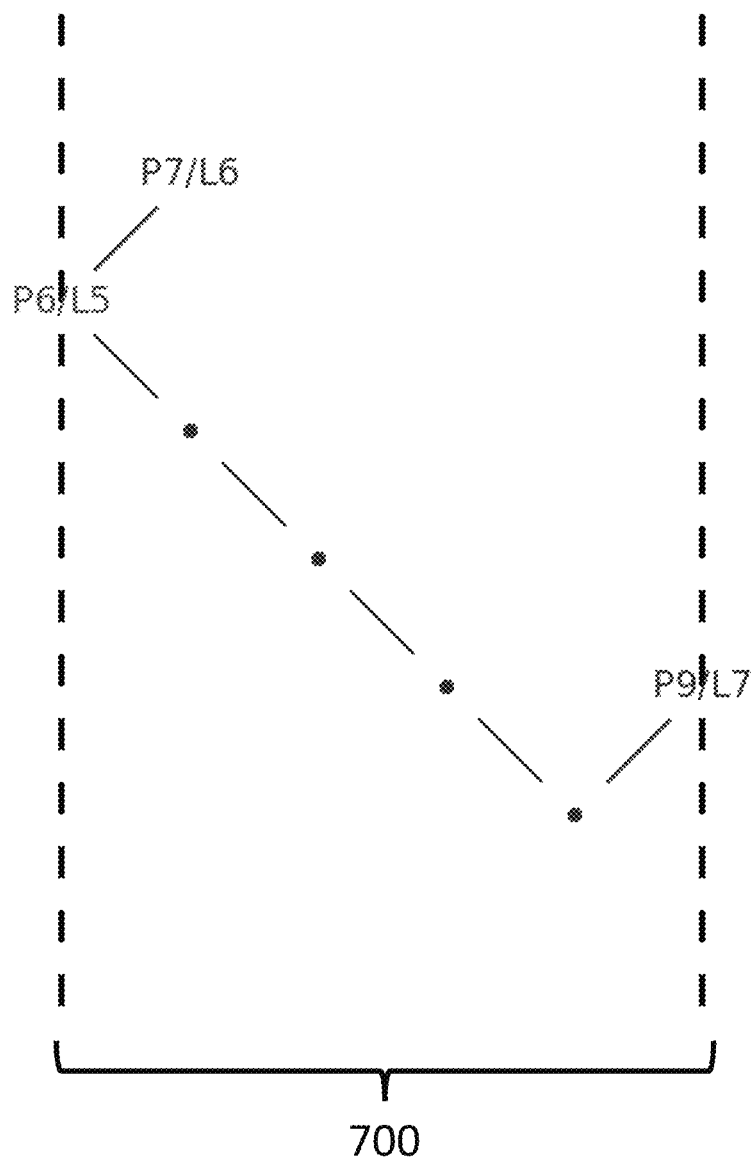

FIG. 3 illustrates a diagram of alternative networking devices and their networking environment in accordance with embodiments of the present technology. The depicted environment is an infrastructure operating a datacenter 300 connected to the Internet 30. The datacenter 300 comprises a first set of routers 301 and a second set of routers 302. The first set of routers 301 may be referred to as backbone routers managing a plurality of distinct networks operated by the datacenter 300. The second set of routers 302 may be referred to as datacenter routers each managing network connections of a plurality of servers 303 operated by the datacenter 300. The datacenter 300 also comprises an anti-DDoS system 304 also referred to as a vacuum system VAC. In some embodiments, the anti-DDoS system 304 may be connected to the first set of routers 301 and/or to the second set of routers 304 so as to filter the network packets received from the Internet 30. In some embodiments, the anti-DDoS system 304 implements mitigation measures consisting of filtering illegitimate network packets while letting legitimate network packets access a network of the datacenter (e.g., access the servers 303). In some embodiments, the anti-DDoS system 304 may comprise a plurality of sub-systems, such as sub-systems 305-308, which may be dedicated to certain given tasks.

As an example, but without being limitative, a first sub-system 305, also referred to as a Pre-Firewall, may operate control logic aiming at fragmenting network packets, controlling size of network packets and/or authorizing certain network packets based on associated protocols (e.g., TCP, UDP, ICMP, GRE protocols) while blocking other network packets (e.g., protocols other than TCP, UDP, ICMP, GRE protocols). As another example, but without being limitative, a second sub-system 306, also referred to as a Firewall network, may operate control logic aiming at authorizing/blocking IP addresses, authorizing/blocking protocols (e.g., IP, TCP, UDP, ICMP, GRE protocols), authorizing/blocking one or more network ports (e.g., TCP or UDP ports), authorizing/blocking SYN/TCP, authorizing/blocking network packets other than SYN/TCP. As another example, but without being limitative, a third sub-system 307, also referred to as Shield, may operate control logic aiming at analysing network packets (e.g., so as to check a header, a checksum, etc). As another example, but without being limitative, a fourth sub-system 308, also referred to as Armor, may operate control logic aiming at analysing network packets and/or conducting detection of invalid TCP flags, invalid sequence number, zombie network packets, TCP SYN authentication, DNS authentication, DNS limitation, etc.

In some embodiments, the fourth sub-system 308 generates and/or implements a tree structure associating network packet signatures with network packet metadata in accordance with embodiments of the present technology. As it may be appreciated, the tree structure may equally be generated and/or implemented on different networking devices or even be operated in a distributed manner over a plurality of networking devices (e.g., be implemented by one or more of the sub-systems 305-308). In some embodiments, the networking device generating and/or implementing the tree structure associating network packet signatures with network packet metadata in accordance with embodiments of the present technology may comprise one or more vRouters comprising FPGA cards. An example of configuration suitable for the networking device may be, without being limitative, as follows:

| Processor | 2x1697v4 |
| RAM | 64 GB DD4 ECC |
| Network Cards | 2x ConnectX-4 2x 100 Gbps |
| FPGA | XUPP3R with 4x 100 Gbps |

Other configurations may also be used and will become readily apparent to the person skilled in the art of the present technology.

Turning now to FIGS. 4-7, a diagram of a tree structure 400 in accordance with embodiments of the present technology is illustrated. The tree structure comprises sub-portions 402, 502, 504, 602, 604 and 700. The number of levels of the tree structure and/or the number of sub-portions is exemplary and should not be construed as being limitative of the present technology. The tree structure comprises non-leaf nodes (e.g., P2/L2, P5, P6/L5) and leaf nodes (e.g., P1/L1, P3/L3, P4/L4). In some embodiments, such as the one depicted in FIGS. 4-9, a non-leaf node may be associated with network packet metadata (e.g., a label). As an example the non-leaf node P6/L5 is associated with a label "5".

Each non-leaf node is a single bit test node allowing directing navigation throughout the tree structure. The non-leaf nodes may be associated with one child or with two children. In instances wherein a non-leaf node is associated with two children, a value of a bit may determine which one of the two children should be considered at the next level of the tree structure. As an example, the non-leaf node P10 may direct to P12/L8 if the value of the tested bit is 1 and may direct to P11/L9 if the value of the tested bit is 0. In some embodiments, a value of a bit is to be tested even if the non-leaf node has only one child. In some embodiments, a presence of a value of a bit determines if the lookup throughout the tree structure should continue.

Each leaf node is associated with network packet metadata (e.g., a label), such as, for example, the leaf nodes P3/L3, P1/L1, P11/19. Upon navigating throughout the tree structure from a root (e.g., the root P0/L0), reaching a leaf node results in the navigation being over and a determination that the network packet signature may be associated with the metadata of the leaf node. In some embodiments wherein leaf nodes are associated with labels, a chosen label is the one of the last matching node thereby avoiding having to generate one leaf for each possible termination.

As an example, a path throughout the tree structure 400 from the root P0/L0 to the leaf node P3/L3 comprises a non-leaf node 410 having a single child non-leaf node 412 which in turn as two children non-leaf nodes 414 and 416. The non-leaf node 414 has two children, the non-leaf node 418 and the leaf node P3/L3. The path throughout the tree structure 400 from the root P0/L0 to the leaf node P3/L3 may be defined by the following sequence of bits "0011". As another example, the path throughout the tree structure 400 from the root P0/L0 to the leaf node P2/L2 may be defined by the following sequence of bits "00100".

As illustrated by FIGS. 4-7, the non-leaf node P5 leads to the sub-portion 502 which itself leads to the non-leaf node P12/L8 and the leaf node P11/L9. The non-leaf node P2/L2 leads to the sub-portion 504 which itself leads to the non-leaf node P6/L5. The non-leaf node P12/L8 leads to the sub-portion 602 which itself leads to the non-leaf node P13/L8. The non-leaf node P13/L8 leads to the sub-portion 604 which itself leads to the leaf node P14/L10. The non-leaf node P6/L5 leads to the sub-portion 700 which itself leads to the leaf node P7/L6 and the leaf node P9/L7.

Amongst multiple aspects, the present technology provides a method of compressing a tree structure, such as the tree structure 400. The method of compressing the tree structure established a number of consecutive non-leaf nodes having a single child for a given sub-portion of the tree structure. In some embodiments, a non-leaf node having a single child may be referred to as a non-leaf node not having a bifurcation, in other words it only has one branch. As an example, the sub-portion may be defined by a number of levels of the tree structure as illustrated by sub-portions 402, 502, 504, 602, 604 and 700. The sub-portion may be a single branch or a combination of branches defining a sub-tree structure. In embodiments, the number of levels may be defined by a number of bits. In some embodiments, the number of levels may be defined as a number of non-leaf nodes and/or leaf nodes. As an example, the sub-section may be defined as 30 levels of a tree structure (i.e., 30 bits). Variations may be envisioned without departing from the scope of the present technology, as an example, the number of levels may be more or less than 30 and may depend on certain constraints (e.g., a memory structure).

In some embodiments, the method of compressing the tree structure determines whether the sub-portion of the tree structure is to be compressed or not. In some embodiments, this determination is based on a number of consecutive non-leaf nodes having a single child. In some embodiments, the compression threshold may be 6 bits so that a sub-portion comprising more than 5 consecutive non-leaf nodes having a single child is determined as to be compressed. Variations may be envisioned without departing from the scope of the present technology, as an example, the compression threshold may be more or less than 5 and may depend on certain constraints (e.g., a memory structure). As an example, the sub-portion 402 comprises multiple non-leaf nodes and multiple leaf nodes however, the sub-portion 402 does not comprise at least 5 consecutive non-leaf nodes having only one child (e.g., the non-leaf nodes 412 and 414 each has two children). As a result the sub-portion is determined as not to be compressed. As another example, the sub-portion 504 comprises 10 consecutive non-leaf nodes having only one child (i.e., 0011111100), determination may then be made that the sub-portion 504 may be compressed.

Following a similar logic, determination may be made that the sub-portion 502 is not to be compressed, the sub-portion 602 is to be compressed (although not represented, the sub-portion 602 comprises 32 consecutive non-leaf nodes having only one child), the sub-portion 604 (only 3 non-leaf nodes with only one child) and the sub-portion 700 (one non-leaf node has two children) are not to be compressed. In some embodiments, a maximum size of a sequence of consecutive non-leaf nodes having only one child may be defined. In the example described above, the maximum size of a sequence is 30 (e.g., 30 bits). As a result, even though sub-portions 602 and 604 combined together would lead to 35 consecutive non-leaf nodes having only one child, the sub-portion 602 is cut off at 30, thereby leaving the sub-portion 604 as not to be compressed (as it only comprises 5 non-leaf nodes). As the person skilled in the art of the present technology may appreciate, multiple variations of the compression threshold and/or the maximum size of the sequence may be envisioned without departing from the scope of the present technology.

If the method determines that a given sub-portion of the tree structure determined is to be compressed, a compressed node data structure is generated. If the method determines that a given sub-portion of the tree structure determined is to not be compressed, a non-compressed node data structure is generated.

Figure 8:
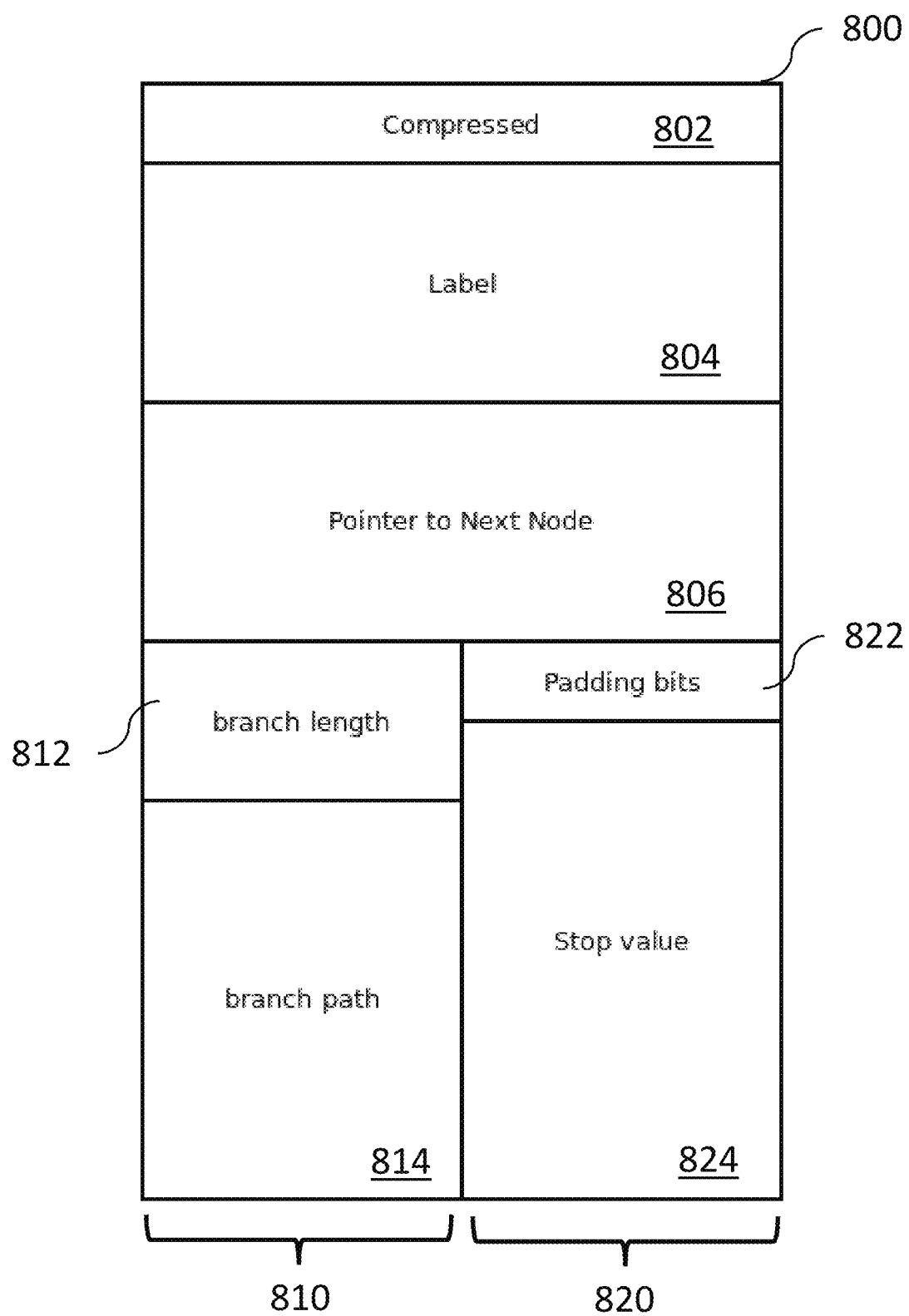
FIG. 8 illustrates a diagram of a node data structure in accordance with embodiments of the present technology.

An example of node data structure 800 is shown at FIG. 8, the node data structure 800 illustrates both an example of compressed node data structure 810 and an example of non-compressed data structure 820 comprising common data structure portions 802, 804 and 806. The node data structure 800 has a total size of 72 bits. In some embodiments, 72 bits is a width of a memory cell wherein the node data structure 800 is stored. The node data structure 800 comprises a first block 802 "compressed" comprising 1 bit which indicates whether the node data structure 800 is compressed or not. The node data structure 800 also comprises a second block 804 "label" comprising 16 bits which may indicate a label value (also referred to as network packet metadata) to be associated with a network packet signature if the node data structure 800 represents a leaf node. The node data structure 800 also comprises a third block 806 "pointer to next node" comprising 20 bits which indicates a memory address of another node data structure with which the node data structure 800 is associated (e.g., a parent node—child node association).

For instances wherein the node data structure embodies a compressed node data structure 810, the node data structure also comprises a fourth block 812 "branch length" comprising 5 bits which indicates a number of consecutive non-leaf nodes having only one child. In some embodiments, a maximum number of consecutive non-leaf nodes is 30. The node data structure also comprises a fifth block 814 "branch path" comprising 30 bits which indicates a path to follow from the current node to get to the next node. In some embodiments, the path comprises a sequence of bits formed by a concatenation of the single bits associated with each one of the consecutive non-leaf nodes of the compressed sub-portion of the tree structure (e.g., "10111100001000001"). In some embodiments, a compression threshold is 5 meaning that the number of bits of the sequence is equal or greater than 6. If the number of bits is equal or less than 5 then a non-compressed node data structure is generated. In some other embodiments, a compression threshold is 3 meaning that the number of bits of the sequence is equal or greater than 4. If the number of bits is equal or less than 3 then a non-compressed node data structure is generated. Multiple value of the compression threshold may therefore be envisioned without departing from the scope of the present technology.

In some embodiments, the number of bits of the sequence of the compressed node data structure is determined by a presence of a non-leaf node having a child leaf node (e.g., the tree structure ends at the child leaf node). In some embodiments, the number of bits of the sequence of the compressed node data structure is determined by a presence of a non-leaf node having more than one child (e.g., two children) thereby identifying a bifurcation in the tree structure which requires an additional node data structure to be created (which could be compressed or non-compressed). In some embodiments, the number of bits of the sequence of the compressed node data structure is a predefined maximum size of the sequence (e.g., 30 so as to meet the format constraints of the node data structure).

For instances wherein the node data structure embodies a non-compressed node data structure 820, the node data structure also comprises a sixth block 822 "padding bits" comprising 3 bits which may be useless bits in this configuration (i.e., they are "padding" the data structure so that it has a constant size, for example 72 bits). The node data structure also comprises a seventh block 824 "stop value" comprising 32 bits which may indicate if the node is a non-leaf node (e.g., not an end of the tree) or a leaf-node (e.g., end of the tree). In some embodiments, the seven block 824 indicates a path of the sub-portion of the tree structure. The path comprises a sequence of bits formed by a concatenation of one or more single bits associated with at least one non-leaf node of the sub-portion of the tree structure, the at least one non-leaf node having more than one child, the number of bits of the sequence being less than the compression threshold (e.g., "1011"). In some embodiments, a compression threshold is 5 meaning that the number of bits of the sequence is no more than 5. If the number of bits is more than 5 then a compressed node data structure is generated.

In some embodiments, a non-compressed node may check 5 bits of signature, which means that there may be 2-5 possible paths of 5 bits (00000, 00001, 00010, 00011, 00100, . . . ). There may be one "stop" bit for each of the possible paths: The bit 0 is zero if and only if the path 00000 corresponds to a child node, otherwise it is one. The bit 1 is zero if and only if the path 00001 corresponds to a child node, otherwise it is one. This results in a 32 bits value. Each bit corresponding to a possible path and a possible child node. In some embodiments, a non-compressed node can have up to 32 children. The pointer (806) may point to the first child, the next children may be stored consecutively in memory (so the first child is at the address in 806, the second child at address+1, the third child at address+2 . . . ). A non-compressed node may have from 0 to 32 children. In contrast, in some embodiments, a compressed node may exactly have one child. A non-compressed nodes may support up to 32 paths of 5 bits and a compressed node may support exactly one path of 30 bits.

Referring back to the method of compressing a tree structure, if the method determines that a given sub-portion of the tree structure is to be compressed, a compressed node data structure is generated (e.g., the compressed node data structure 810). If the method determines that a given sub-portion of the tree structure determined is to not be compressed, a non-compressed node data structure is generated (e.g., the non-compressed node data structure 820). In accordance with the present technology, the sub-portion 504 of the tree structure 400 may be represented by a compressed node data structure P2/L2 comprising a path defined by a sequence of 10 bits "0011111100".

Figure 9:
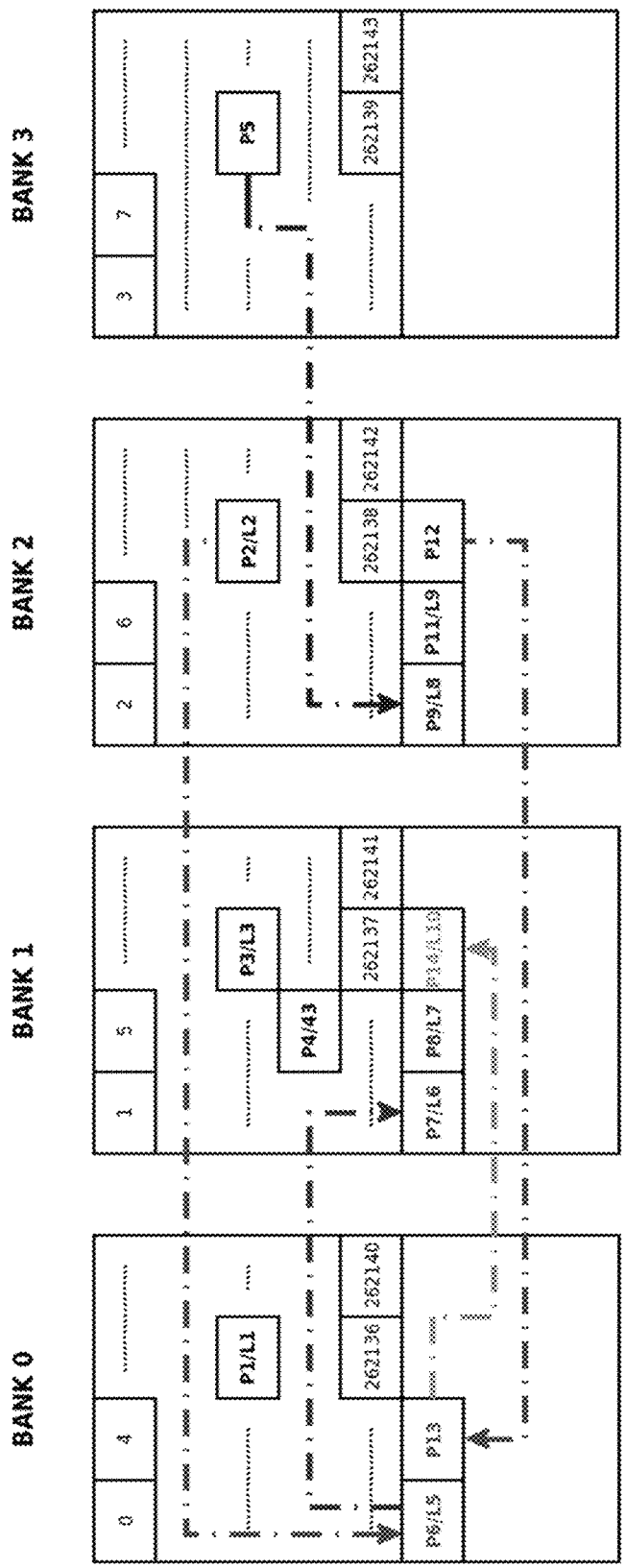
FIG. 9 illustrates a diagram of a data structure stored in multiple banks of memory in accordance with embodiments of the present technology.

Turning now to FIG. 9, an example of a non-transitory computer-readable memory comprising four memory banks ("bank 0", "bank 1", "bank 2" and "bank 3") is illustrated. In some embodiments, all four memories are part of a same non-transitory computer-readable memory. In some other embodiments, each one of the four memories defines a distinct non-transitory computer-readable memory. In some embodiments, the four memory banks may be referred to as a first non-transitory computer-readable memory, a second non-transitory computer-readable memory, a third non-transitory computer-readable memory and a fourth non-transitory computer-readable memory. In some embodiments, each one of the first, second, third and fourth non-transitory computer-readable memories is embodied as a distinct QDR SRAM memory. In such embodiments, the bank 0 would be associated with a first QDR SRAM memory, the bank 1 would be associated with a second QDR SRAM memory, the bank 2 would be associated with a third QDR SRAM memory and the bank 3 would be associated with a fourth QDR SRAM memory.

In accordance with embodiments of the present technology and referring to FIG. 8 in conjunction with FIGS. 4-7, multiple node data structures modeling the tree structure 400 are stored across the bank 0, bank 1, bank 2 and bank 3. The multiple node data structures comprise compressed node data structures and non-compressed data structures. A method of storing the multiple node data structures comprises storing a first node data structure in a first one of the banks and a second node data structure (to which the first node data structure points to) to a second one of the banks thereby avoiding a same bank being accessed two times in a row upon navigating through the representation of the tree structure. As an example, the compressed node data structure P2/L2 is stored in bank 2 and points to (e.g., based on the "point to address" stored in the compressed node data structure) non-compressed node data structure P6/L5 stored in bank 0 which itself points to non-compressed node data structure P7/L6 and to P8/L7 which are both stored in bank 1 (i.e., P7/L6 and P8/L7 are stored in a same bank as they represent two leaf nodes associated with the non-leaf nodes P6/L5). As another example, non-compressed node data structure P5 stored in bank 3 points to non-compressed node data structures P9/L8 and P11/L9 stored in bank 2 associated with compressed data structure P12 stored in bank 2 which points to non-compressed node data structure P13 stored in bank 0 which in turn points to the non-compressed node data structure P14/L10 stored in bank 1. As a result, navigating through the tree structure may be achieved by accessing a distinct one of the four banks from one node to the other. A distribution of the node data structures across the banks may be as such that for each new node data structure to be introduced, a chosen bank is a bank with the lowest number of already stored node data structures. For a given branch of the tree structure, all the banks have to be used before looping back to a used bank. As a result, the present technology may allow, in certain embodiments, optimizing a number of access to the banks and a use of the banks. As an example, a tree structure associating network packet signatures associated with IPv6 addresses with network packet labels and comprising compressed node data structures and non-compressed node data structure generated in accordance with the present technology may not require no more than eight steps to return an associated network packet label. As a result, the present technology may allow reducing an amount of memory to be used (which is a benefit even more prevalent in contexts where high performance memories, such as QDR SRAM, is being used) while improving debit over conventional approaches.

In some embodiments, each one the banks is divided into three parts. A first part storing nodes of a first step of the tree, a second part storing nodes of the following steps of the tree and a third part which remains unused. When an update of the tree structure is required, a new node data structure is introduced in the third part of the banks and then a memory address contained in a node data structure stored in the first part is updated so that it now points to the newly created node data structure stored in the third part. If an additional update is required, a new node data structure is introduced in the second part of one of the banks and then a memory address contained in a node data structure stored in the first part is updated so that it now points to the newly created node data structure stored in the second part. The method may therefore create new node data structures by alternating creation in the second part and the third part. This approach may allow updating of the tree structure while providing constant access to the tree structure.

In some embodiments, if a non-leaf node points to a useless leaf node which is to be removed, a label (e.g., network packet metadata) may directly be stored in the node data structure associated with the non-leaf node by replacing the pointer to the leaf node by a value associated with the label. This approach may allow accessing the value of the label without requiring an extra step of accessing another node data structure to which the non-leaf node would have pointed to.

Figure 10:
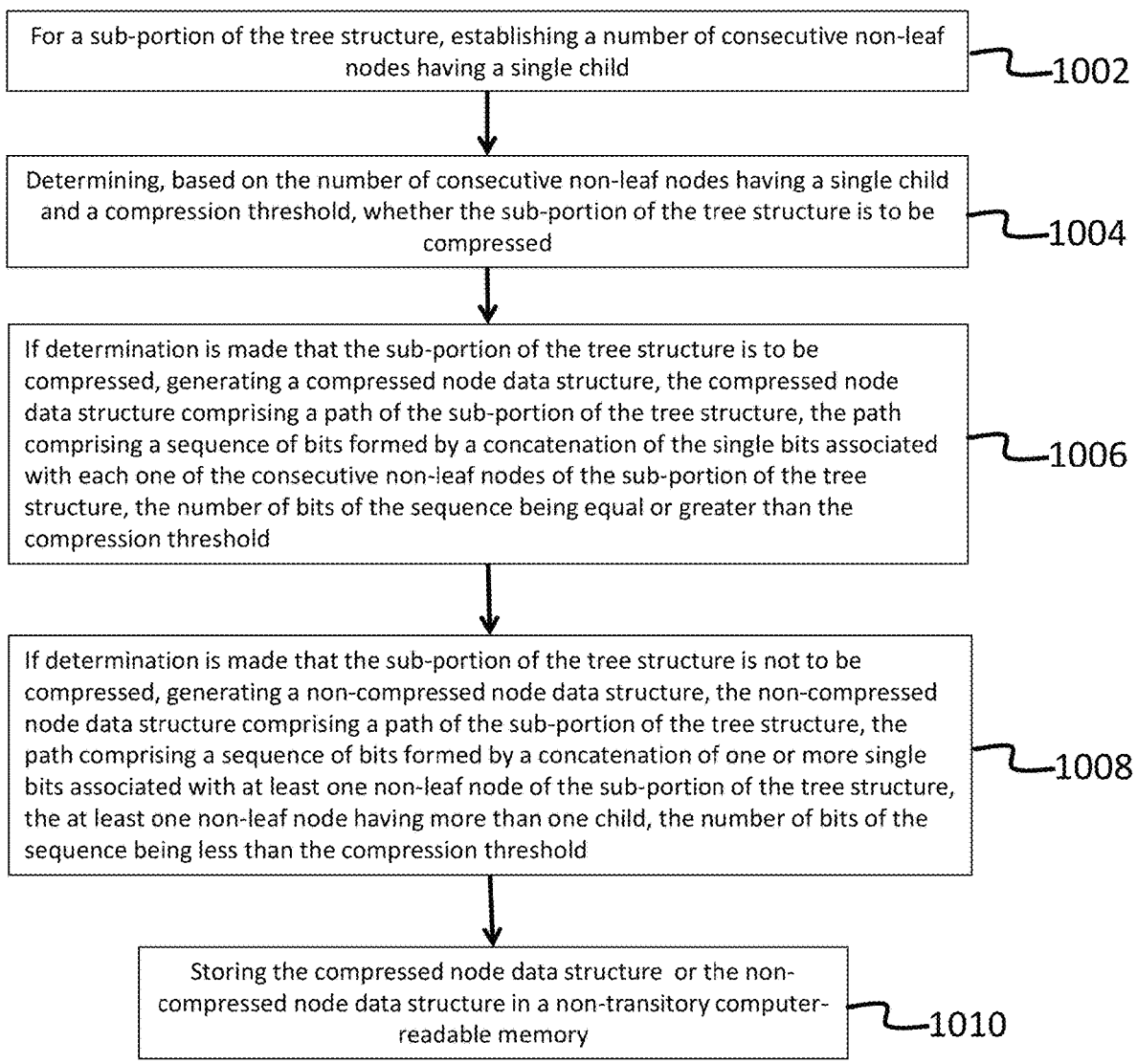
FIG. 10 illustrates a first flow diagram of a method of compressing a tree structure in accordance with embodiments of the present technology.

Turning now to FIG. 10, a flow diagram of a method 1000 for compressing a tree structure associating network packet signatures with network packet metadata according to one or more illustrative aspects of the present technology is disclosed. In one or more embodiments, the method 1000 or one or more steps thereof may be performed by one or more computing devices or entities. For example, portions of the method 1000 may be performed by components of the networking devices 100 or 190. The method 1000 or one or more steps thereof may be embodied in computer-executable instructions that are stored in a computer-readable medium, such as a non-transitory computer-readable medium. Some steps or portions of steps in the flow diagram may be omitted or changed in order.

In one or more embodiments, the tree structure associating network packet signatures with network packet metadata comprises a plurality of non-leaf nodes of single bit test nodes and a plurality of leaf nodes comprising network packet metadata.

At step 1002, for a sub-portion of the tree structure, the method establishes a number of consecutive non-leaf nodes having a single child. Then at a step 1004, the method 1000 determines, based on the number of consecutive non-leaf nodes having a single child and a compression threshold, whether the sub-portion of the tree structure is to be compressed. If determination is made that the sub-portion of the tree structure is to be compressed, then the method 1000 proceeds to a step 1006. If determination is made that the sub-portion of the tree structure is not to be compressed, then the method 1000 proceeds to a step 1008.

At a step 1006, a compressed node data structure is generated. The compressed node data structure comprises a path of the sub-portion of the tree structure, the path comprising a sequence of bits formed by a concatenation of the single bits associated with each one of the consecutive non-leaf nodes of the sub-portion of the tree structure, the number of bits of the sequence being equal or greater than the compression threshold. In some embodiments, the number of bits of the sequence of the compressed node data structure is determined by (1) a presence of one of the consecutive non-leaf nodes having a child leaf node, (2) a presence of one of the consecutive non-leaf nodes having more than one child or (3) a predefined maximum size of the sequence. In some embodiments, the compression threshold is 5 bits. In some embodiments, the predefined maximum size of the sequence is 30 bits.

At a step 1008, a non-compressed node data structure is generated. The non-compressed node data structure comprises a path of the sub-portion of the tree structure, the path comprising a sequence of bits formed by a concatenation of one or more single bits associated with at least one non-leaf node of the sub-portion of the tree structure, the at least one non-leaf node having more than one child, the number of bits of the sequence being less than the compression threshold. In some embodiments, the path comprises multiple paths of the sub-portion of the tree structure.

At a step 1010, the method 1000 may store the compressed node data structure or the non-compressed node data structure in a non-transitory computer-readable memory.

In some embodiments, the non-transitory computer-readable memory comprises a first non-transitory computer-readable memory and a second non-transitory computer-readable memory. In some embodiments, the first non-transitory computer-readable memory is a first bank of a first QDR SRAM memory and the second non-transitory computer-readable memory is a second bank of a second QDR SRAM memory.

In some embodiments, the compressed node data structure is a first compressed node data structure and (2) the non-compressed node data structure is a first non-compressed node data structure, wherein a first node data structure comprises one of the first compressed node data structure and the first non-compressed node data structure and a second node data structure comprises one of a second compressed node data structure and a second non-compressed data structure. In some embodiments, the first node data structure is stored in the first non-transitory computer-readable memory and points to a memory address of the second non-transitory computer-readable memory wherein the second node data structure is stored. In some embodiments, the first node data structure can be accessed from the first non-transitory computer-readable memory through a first single memory access and the second node data structure can be accessed from the second non-transitory computer-readable memory through a second single memory access.

In some embodiments, the compressed node data structure is a first compressed node data structure and the non-compressed node data structure is a first non-compressed node data structure and wherein the non-transitory computer-readable memory comprises a first part, a second part and a third part, the first part storing one of the first compressed node data structure and the first non-compressed node data structure pointing to one of a second compressed node data structure and a second non-compressed node data structure stored in the second part and wherein, upon updating the tree structure, storing one of a third compressed node data structure and a third non-compressed node data structure in the third part and modifying the one of the first compressed node data structure and the first non-compressed node data structure so that it points to the one of the third compressed node data structure and the third non-compressed node data structure.

In some embodiments, the method 1000 further comprises at least one (1) transmitting a network packet based on a priority established by the network packet metadata, (2) identifying services to be performed on a network packet based on the network packet metadata, (3) testing a network packet based on the network packet metadata to establish that the network packet is part of a network attack and/or (4) creating metrics on traffic of network packets based on the network packet metadata.

Although example embodiments are described above, the various features and steps may be combined, divided, omitted, rearranged, revised, or augmented in any desired manner, depending on the specific outcome or application. Various alterations, modifications, and improvements will readily occur to those skilled in the art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method of analyzing network packets for preventing attacks of a network by filtering illegitimate network packets while letting legitimate network packets access the network, the filtering being based on an association between network addresses and data packet classifications, the association being implemented as a tree structure, the data packet classifications allowing determining whether a network packet is legitimate, the method being executed by a computing device, the method comprising:

compressing the tree structure associating the network addresses with the data packet classifications, the tree structure comprising a plurality of non-leaf nodes of single bit test nodes and a plurality of leaf nodes comprising data packet classifications, the step of compressing comprising:

determining, based on a number of consecutive non-leaf nodes having a single child and a compression threshold, whether a sub-portion of the tree structure comprising the consecutive non-leaf nodes having a single child is to be compressed;

if determination is made that the sub-portion of the tree structure is to be compressed:

generating a compressed sub-portion of the tree structure, the compressed sub-portion of the tree structure comprising a sequence of bits formed by a concatenation of the single bits associated with each one of the consecutive non-leaf nodes of the sub-portion of the tree structure, the number of bits of the sequence being equal or greater than the compression threshold; and storing the compressed sub-portion of the tree structure in a non-transitory computer-readable memory.

2. The method of claim 1, wherein the number of bits of the sequence of the compressed sub-portion of the tree structure is determined by (1) a presence of one of the consecutive non-leaf nodes having a child leaf node, (2) a presence of one of the consecutive non-leaf nodes having more than one child or (3) a predefined maximum size of the sequence.

3. The method of claim 1, further comprising:
if determination is made that the sub-portion of the tree structure is not to be compressed:
generating a non-compressed sub-portion of the tree structure, the non-compressed sub-portion of the tree structure comprising a sequence of bits formed by a concatenation of one or more single bits associated with at least one non-leaf node of the sub-portion of the tree structure having more than one child, the number of bits of the sequence being less than the compression threshold; and
storing the non-compressed sub-portion of the tree structure in the non-transitory computer-readable memory.

4. The method of claim 1, wherein the compression threshold is 5 bits.

5. The method of claim 2, wherein the predefined maximum size of the sequence is 30 bits.

6. The method of claim 1, wherein the non-transitory computer-readable memory comprises a first non-transitory computer-readable memory and a second non-transitory computer-readable memory.

7. The method of claim 6, wherein (1) the compressed sub-portion of the tree structure is a first compressed sub-portion of the tree structure and (2) the non-compressed sub-portion of the tree structure is a first non-compressed sub-portion of the tree structure, wherein a first sub-portion of the tree structure comprises one of the first compressed sub-portion of the tree structure and the first non-compressed sub-portion of the tree structure and a second sub-portion of the tree structure comprises one of a second compressed sub-portion of the tree structure and a second non-compressed sub-portion of the tree structure.

8. The method of claim 7, wherein the first sub-portion of the tree structure is stored in the first non-transitory computer-readable memory and points to a memory address of the second non-transitory computer-readable memory wherein the second sub-portion of the tree structure is stored.

9. The method of claim 8, wherein the first sub-portion of the tree structure can be accessed from the first non-transitory computer-readable memory through a first single memory access and the second sub-portion of the tree structure can be accessed from the second non-transitory computer-readable memory through a second single memory access.

10. The method of claim 6, wherein the first non-transitory computer-readable memory is a first bank of a first QDR SRAM memory and the second non-transitory computer-readable memory is a second bank of a second QDR SRAM memory.

11. The method of claim 3, wherein the compressed sub-portion of the tree structure is a first compressed sub-portion of the tree structure and the non-compressed sub-portion of the tree structure is a first non-compressed sub-portion of the tree structure and wherein the non-transitory computer-readable memory comprises a first part, a second part and a third part, the first part storing one of the first compressed sub-portion of the tree structure and the first non-compressed sub-portion of the tree structure pointing to one of a second compressed sub-portion of the tree structure and a second non-compressed sub-portion of the tree structure stored in the second part and wherein:
upon updating the tree structure, storing one of a third compressed sub-portion of the tree structure and a third non-compressed sub-portion of the tree structure in the third part and modifying the one of the first compressed sub-portion of the tree structure and the first non-compressed sub-portion of the tree structure so that it points to the one of the third compressed sub-portion of the tree structure and the third non-compressed sub-portion of the tree structure.

12. The method of claim 1, further comprising at least one (1) transmitting a network packet based on a priority established by the data packet classification, (2) identifying services to be performed on a network packet based on the data packet classification, (3) testing a network packet based on the data packet classification to establish that the network packet is part of a network attack and/or (4) creating metrics on traffic of network packets based on the data packet classification.

13. A method of filtering illegitimate network packets from a network while letting legitimate network packets access the network, the filtering being based on an association between network addresses and network packet metadata, the association being implemented as a tree structure associating network packet signatures with the network packet metadata, the tree structure comprising a plurality of non-leaf nodes of single bit test nodes and a plurality of leaf nodes comprising the network packet metadata, the method comprising:
compressing the tree structure associating the network addresses with the network packet metadata, wherein the compressing comprises:
for a sub-portion of the tree structure, establishing a number of consecutive non-leaf nodes having a single child;
determining, based on the number of consecutive non-leaf nodes having a single child and a compression threshold, whether the sub-portion of the tree structure is to be compressed;
if determination is made that the sub-portion of the tree structure is to be compressed:
generating a compressed node data structure, the compressed node data structure comprising a path of the sub-portion of the tree structure, the path comprising a sequence of bits formed by a concatenation of the single bits associated with each one of the consecutive non-leaf nodes of the sub-portion of the tree structure, the number of bits of the sequence being equal or greater than the compression threshold; and
storing the compressed node data structure in a non-transitory computer-readable memory.

14. A system for analysing network packets for preventing attacks of a network by filtering illegitimate network packets while letting legitimate network packets access the network, the filtering being based on an association between network addresses and data packet classifications, the association being implemented as a tree structure, the data packet classifications allowing determining whether a network packet is legitimate, the system comprising:
a processor; and at least one memory comprising executable instructions which, upon being executed by the processor, cause the system to:
  compress the tree structure associating the network addresses with the data packet classifications, the tree structure comprising a plurality of non-leaf nodes of single bit test nodes and a plurality of leaf nodes comprising data packet classifications, the step of compressing comprising:
    determining, based on a number of consecutive non-leaf nodes having a single child and a compression threshold, whether a sub-portion of the tree structure comprising the consecutive non-leaf nodes having a single child is to be compressed, and
    if determination is made that the sub-portion of the tree structure is to be compressed:
      generating a compressed sub-portion of the tree structure, the compressed sub-portion of the tree structure comprising a sequence of bits formed by a concatenation of the single bits associated with each one of the consecutive non-leaf nodes of the sub-portion of the tree structure, the number of bits of the sequence being equal or greater than the compression threshold; and
    store the compressed sub-portion of the tree structure.

15. The system of claim 14, wherein the number of bits of the sequence of the compressed sub-portion of the tree structure is determined by (1) a presence of one of the consecutive non-leaf nodes having a child leaf node, (2) a presence of one of the consecutive non-leaf nodes having more than one child or (3) a predefined maximum size of the sequence.

16. The system of claim 14, wherein the step of compressing further comprises:
  if determination is made that the sub-portion of the tree structure is not to be compressed:
    generating a non-compressed sub-portion of the tree structure, the non-compressed sub-portion of the tree structure comprising a sequence of bits formed by a concatenation of one or more single bits associated with at least one non-leaf node of the sub-portion of the tree structure having more than one child, the number of bits of the sequence being less than the compression threshold; and
  storing the non-compressed sub-portion of the tree structure.

17. The system of claim 14, wherein the compression threshold is 5 bits.

18. The system of claim 15, wherein the predefined maximum size of the sequence is 30 bits.

19. The system of claim 14, wherein the at least one memory comprises a first non-transitory computer-readable memory and a second non-transitory computer-readable memory.

20. The system of claim 19, wherein (1) the compressed sub-portion of the tree structure is a first compressed sub-portion of the tree structure and (2) the non-compressed sub-portion of the tree structure is a first non-compressed sub-portion of the tree structure, wherein a first sub-portion of the tree structure comprises one of the first compressed sub-portion of the tree structure and the first non-compressed sub-portion of the tree structure and a second sub-portion of the tree structure comprises one of a second compressed sub-portion of the tree structure and a second non-compressed sub-portion of the tree structure.

* * * * *